United States Patent [19]

Bordat

[11] 4,437,355
[45] Mar. 20, 1984

[54] BEVEL GEAR POWER TRANSMITTING GEAR TRAINS

[75] Inventor: André Bordat, Rueil Malmaison, France

[73] Assignee: Constructions Mecaniques de Normandie, Paris, France

[21] Appl. No.: 257,609

[22] Filed: Apr. 27, 1981

[30] Foreign Application Priority Data

Apr. 29, 1980 [FR] France ............................. 80 09702

[51] Int. Cl.³ ............... F16H 35/00; F16H 35/06; F16H 57/00; F16H 1/14
[52] U.S. Cl. .................................... 74/385; 74/406; 74/410; 74/417; 74/396
[58] Field of Search ............... 74/406, 385, 410, 417, 74/423, 424, 395, 396, 398

[56] References Cited

U.S. PATENT DOCUMENTS

| | | | |
|---|---|---|---|
| 1,010,604 | 12/1911 | Dourte | 74/385 |
| 1,351,470 | 8/1920 | Davis | 74/410 |
| 2,865,219 | 12/1958 | Allen | 74/410 |
| 3,597,989 | 8/1971 | Benson | 74/385 |
| 3,954,020 | 5/1976 | West et al. | 74/410 |

*Primary Examiner*—Lawrence J. Staab
*Assistant Examiner*—Michael D. Bednarek
*Attorney, Agent, or Firm*—Parmelee, Bollinger & Bramblett

[57] ABSTRACT

Power transmitting gear trains comprising four bevel gears (2, 3, 5, 6) mounted between a vertical floating driving shaft (1) and a horizontal propeller shaft (4). The driving shaft integral with gear 2 is pivotably mounted about its axis X, but without axial freedom, on a rigid body 20 itself pivotably mounted about the axis Y of gears 3 and 5, with axial freedom.

5 Claims, 2 Drawing Figures

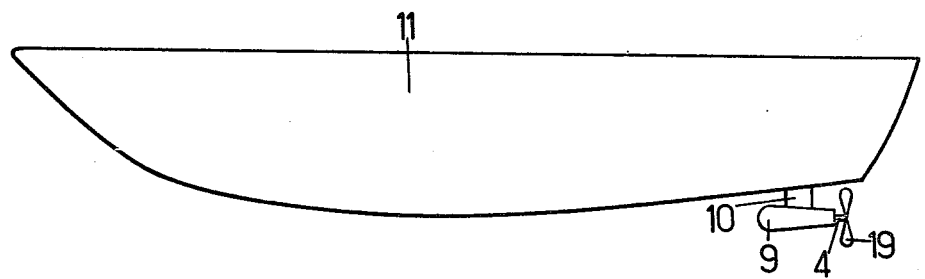
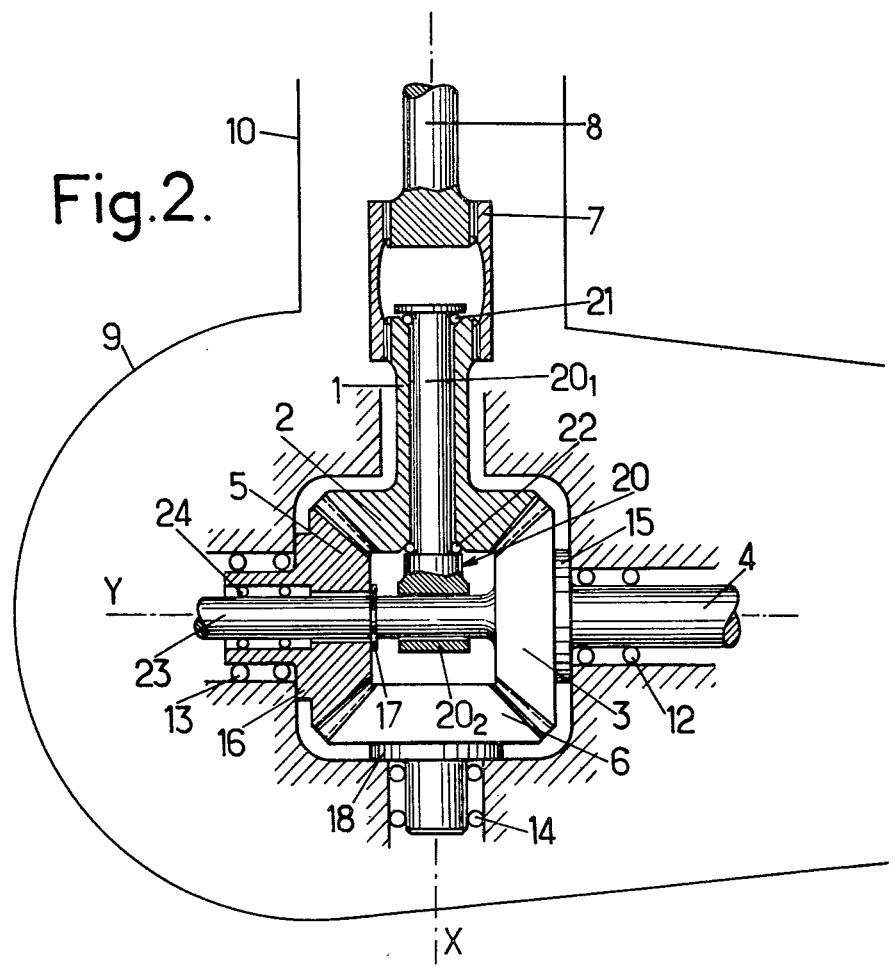

BEVEL GEAR POWER TRANSMITTING GEAR TRAINS

The invention relates to bevel gear power transmitting gear trains comprising a first bevel gear coupled to a driving shaft, a second bevel gear coupled to a driven shaft whose axis is perpendicular to that of the driving shaft and meshing with the first one, a third loose bevel gear coaxial with the second one and meshing with the first one and a fourth loose bevel gear coaxial with the first one and meshing with the second and the third ones.

It relates more particularly, among these gear trains, to these for transmitting a relatively high power—generally between 100 and 20,000 hp—from a shaft vertical to the horizontal shaft of an impelling propeller which could be airborne but which is preferably seaborne, the whole of the train considered being then advantageously contained in a specially streamlined bulb intended to be immersed in the water for application of this train to the propulsion of a boat capable of reaching high speeds.

Four bevel gear trains of the kind in question present, over two bevel gear trains, the advantage of distributing over both diametrically opposite contact faces of each gear, and not just over a single contact face of this gear, the tangential forces applied to said gear, which practically doubles the power transmitted for given diameters of the gears and so for a given transverse dimension of the train and of the bulb which contains it, if such is the case.

In order to provide, in these four gear trains, a proper balance between the torques transmitted respectively between one of the first two gears (generally the first one) and the two gears with which this gear is engaged, it has been proposed mounting said gear so that it remains slightly floating.

In known embodiments, the floating in question of the gear considered is provided not only transversely but also axially:

transverse freedom is obtained by doing away with any guide bearing in the vicinity of said gear, the driving or driven tail shaft integral with this gear being connected to another tail shaft, itself transversely guided in appropriate bearings, by a coupling device allowing certain relative angular and/or transverse movements between the two tail shafts coupled thereby, axial freedom is obtained by forming the coupling device in question so that it makes possible relative axial movements of the two tail shafts coupled thereby.

This coupling device is for example formed by means of splines cooperating mutually with a small play.

With such an assembly it has been discovered that, during operation, the "floating" gear is subjected, by the two gears with which it is engaged, to forces of varying intensity which result in slight axial movements of this floating gear.

The apex of the primitive cone of the "floating" gear then moves away to a greater or lesser degree from the axis common to the primitive cones of the other two gears considered: this deviation is prejudicial to the efficiency of the transmission and is a source of wear and noise, a drawback which is all the more serious the higher the powers transmitted and the higher the rotational speeds involved.

To remedy this drawback, in accordance with the invention, said apex of the primitive cone of the "floating" gear is permanently maintained on said axis common to the other two gears.

To this end, the "floating" gear is pivotably mounted about its axis X, but without freedom for axial movement, on a rigid body itself pivotably mounted about the common axis Y, perpendicular to X, of the two gears with which this gear is engaged, with freedom for axial movement along this axis Y.

In preferred embodiments, recourse is had furthermore to one and/or the other of the following arrangements:

the floating gear is the first gear of the train, i.e. the one integral with the driving shaft, the rigid body is in the general form of a swivel pin with axis X extended at one of its ends by a bearing with axis Y and first means are provided for pivotably mounting the floating gear on the swivel pin while securing it axially with respect to this swivel pin, and second means are provided for pivotably mounting the bearing with respect to the axis Y, with freedom for axial movement with respect thereto, in a train according to the preceding paragraph, the first means are formed by ball thrust bearings, in a train according to at least the paragraph which precedes the preceding one, the second means are formed by a shaft axially extending the driven shaft inside the train, and possibly integral with this driven shaft, the rigid body is in the general form of a stirrup comprising a cylindrical central housing with axis X and two lugs themselves hollowed out to form two other cylindrical housings with axis Y, and means are provided for pivotably mounted the floating gear in the central housing, while securing it axially with respect to this housing and for pivotably mounting in their two other housings, with freedom for axial movement, the two gears with which this floating gear is engaged.

The invention comprises, apart from these principal arrangements, certain other arrangements which are preferably used at the same time and which will be more explicitly discussed hereafter.

In what follows a preferred embodiment of the invention will be described with reference to the accompanying drawings, in a way which is of course in no wise limiting.

FIG. 1 of these drawings shows very schematically a boat equipped with a marine propeller capable of being driven from an engine through a gear train constructed in accordance with the invention.

FIG. 2 shows such a train.

In a way known per se, the train in question comprises:

a driving shaft 1 with vertical or substantially vertical axis X integral with a first bevel gear 2 with axis X, a second bevel gear 3 with substantially horizontal axis Y perpendicular to axis X, engaging with gear 2 and coupled to a driven shaft 4, a third bevel gear 5 loosely mounted about axis Y, meshing like gear 3 with gear 2, but in an area diametrically opposite the teeth of this gear 2, and a fourth gear 6 loosely mounted about an axis substantially merging with axis X, meshing simultaneously with the two gears 3 and 5.

The driving shaft 1, and so the first gear 2 with which it is integral, are mounted slightly floating in the directions perpendicular to axis X, so as to provide automatic and flexible balancing between the two torques transferred respectively from gear 2 to the two gears 3 and 5 with which it is engaged, i.e. in short between the two driving torque portions transferred to the driven shaft respectively directly because of the direct meshing between the two gears 2 and 3 and indirectly because of the meshing of gear 2 with loose gear 5, which transfers the torques which it receives to gear 3 through gear 6.

To obtain such a "floating" mounting, said shaft 1 is guided by no bearing or plummer block, but is simply connected at the top by means of a splined coupling 7 to a drive shaft 8, itself guided transversely in any way desirable with respect to the casing of the train, which is in the general form of a bulb 9, suspended by a rigid strut 10 from the hull 11 of a boat.

The shafts of gears 3, 5 and 6 are guided transversely and secured axially with respect to bulb 9 by means of bearings 12, 13, 14 and axial thrust bearings 15, 16, 17 and 18.

The driven shaft 4, with substantially horizontal axis Y, is here that of a marine propeller 19 (FIG. 1).

The above mounting allows relatively high powers to be transmitted from the driving shaft 1 to the driven shaft 4, these powers being of the order of twice as high, for given gear diameters, as in he absence of the two loose gears 5 and 6.

At all times, in fact, the position of the floating gear 2 is automatically adjusted between the two gears 3 and 5 which it drives so that the two torques transferred respectively to these two latter are substantially identical, each of the sets of teeth of gears 3 and 5 tending to move away from that of gear 2 engaged therewith with a force which is all the higher the higher the torque transmitted between these two engaged sets of teeth.

To prevent this perpetual automatic adjustment of the position of the driving gear 2 between the two gears 3 and 5 from causing axial movements of this gear 2 likely to place the apex of its primitive cone outside the axis Y of the two gears 3 and 5 and so of their primitive cones, which would be the source of troublesome consequences (wear, noise, loss of efficiency . . . ), there is provided in accordance with the invention a rigid body or structure 20 pivotably mounted about said axis Y, with freedom to move axially along this axis, and gear 2 is mounted so that it is itself free to move angularly about its axis X with respect to this body but so that it is coupled axially with respect to this latter.

In the preferred embodiment illustrated, body 20 comprises an elongate swivel pin $20_1$ with the axis X and a bearing $20_2$ with axis Y extending downwardly this swivel pin $20_1$.

Moreover, the shaft 1-gear 2 assembly has passing therethrough said swivel pin $20_1$ and is mounted on this latter or rather supports this latter through ball thrust bearings 21, 22 and a shaft 23 integral with gear 3 and extending axially shaft 4 inside the train passes jointingly through bearing $20_2$, gear 5 being pivotably mounted, through a ball bearing 24, on an extension of this shaft 23 situated, with respect to said bearing $20_2$, on the side opposite gear 3.

Therefore, body 20 permanently absorbs all the axial thrusts likely to be exerted on the floating gear 2 by the reactions of the sets of teeth and the apex of the primitive cone of this gear 2 remains constantly placed on the axis Y of the two gears 3 and 5 with which it is engaed, while being able to move slightly along its axis Y.

The axial components of the movements ensuring automatic balancing between the torques transferred from gear 2 are therefore totally suppressed, which suppresses by this very fact the principal source of drawbacks of the previously-known constructions.

Body 20 may be considered as a relatively "floating" assembly, exactly for the same reason as the shaft 1-gear 2 assembly, said body being free to move parallel to axis Y and angularly about this axis: these two types of movement are the only ones possible and the maximum amplitude of each of them is relatively small.

Following which and whatever the embodiment adopted, there is finally provided a bevel gear power transmitting gear train whose construction, operation and advantages follow sufficiently from what has gone before.

As is evident, and as it follows moreover already from what has gone before, the invention is in no wise limited to those of its embodiments and modes of application which have been more specially considered; it embraces, on the contrary, all variations thereof.

In particular, the rigid body mounted so as to pivot about axis Y and being able to move parallel to this axis, on which body the floating gear is exclusively pivotably mounted, could be of a type "external" to the train rather than of the "inner" type as described above: this body would then be in the form of a stirrup with two lugs whose central section would comprise a central housing with axis X adapted to pivotably receive shaft 1 without axial freedom and whose two lugs would comprise respectively two lateral housings with axis Y adapted to surround jointingly with axial freedom, the first one, a portion of the driven shaft 4 and the second, an external extension of shaft 23 coupled to shaft 4 and coaxial therewith.

Similarly, the floating gear could be, not the driving gear 2 with substantially vertical axis, but the driven gear 3 with substantially horizontal axis: in this case, it would of course be this latter which would be pivotably mounted without axial freedom on a rigid body, itself pivotably mounted with axial freedom about the substantially vertical axis then truly common to the two gears 2 and 6.

I claim:

1. Bevel gear power transmitting gear train comprising a first bevel gear coupled to a driving shaft, a second bevel gear coupled to a driven shaft with axis perpendicular to that of the driving shaft and engaging with the first one, a third loose bevel gear coaxial with the second one and engaging with the first one and a fourth loose bevel gear coaxial with the first one and engaging with the second and with the third, one of the first two gears being mounted slightly "floating", characterized in that the "floating" gear (2) is pivotably mounted for rotation about its axis X, but without freedom for axial movement, on a rigid body (20) itself pivotably mounted about the common axis Y, perpendicular to X, of the two gears (3, 5) with which the floating gear (2) is in engagement, with freedom for axial movement along this axis Y.

2. The train as claimed in claim 1, characterized in that the floating gear (2) is the first gear of the train, said floating gear (2) being operatively associated with said driving shaft (1).

3. The train as claimed in claims 1 or 2 characterized in that the rigid body (20) is in the general form of a swivel pin ($20_1$) with axis X extended at one of its ends by a bearing ($20_2$) with axis Y and in that there are provided first means for pivotably mounting the floating gear (2) on the swivel pin ($20_1$) for rotation about said axis X, while securing it against axial movement with respect to this swivel pin, and second means for pivotably mounting the bearing ($20_2$) with respect to axis Y, with freedom to move axially with respect thereto.

4. The train as claimed in claim 3, characterized in that the first means are ball thrust bearings (21, 22).

5. The train as claimed in claim 3, characterized in that the second means are formed by a shaft (23) axially extending the driven shaft (4) inside the train.

* * * * *